June 11, 1963  C. DOBELL  3,092,961
ROCKET NOZZLES
Filed Oct. 1, 1959  4 Sheets-Sheet 1
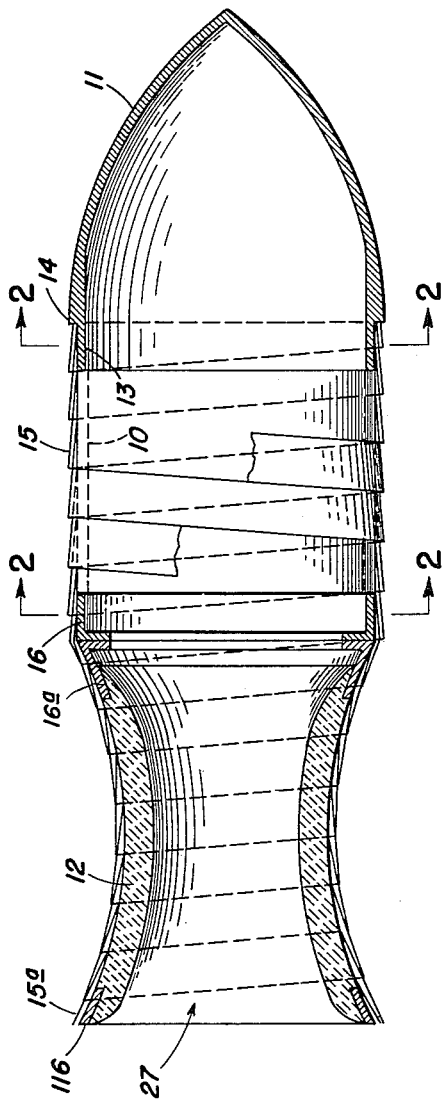
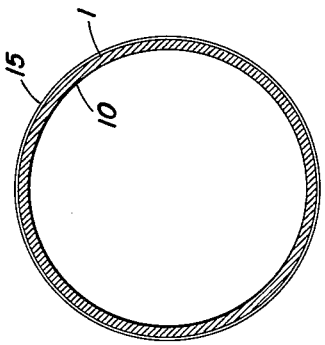
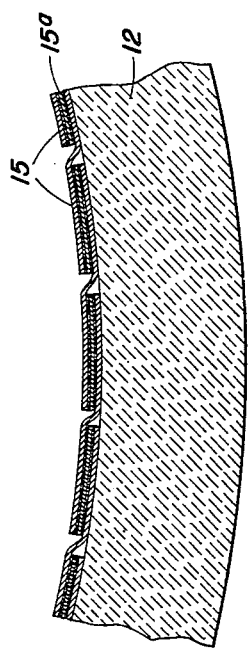
INVENTOR.
Curzon Dobell
BY William J Fox
ATTORNEY June 11, 1963   C. DOBELL   3,092,961
ROCKET NOZZLES Filed Oct. 1, 1959   4 Sheets-Sheet 2

INVENTOR.
Curzon Dobell

BY William J. Fox
ATTORNEY

June 11, 1963 C. DOBELL 3,092,961
ROCKET NOZZLES
Filed Oct. 1, 1959 4 Sheets-Sheet 3

INVENTOR.
Curzon Dobell
BY William J Fox
ATTORNEY

United States Patent Office 3,092,961
Patented June 11, 1963

3,092,961
ROCKET NOZZLES
Curzon Dobell, P.O. Box 643, Nassau, Bahamas
Filed Oct. 1, 1959, Ser. No. 843,805
20 Claims. (Cl. 60—35.6)

This invention relates to rocket nozzles, more particularly to light-weight ceramic nozzles which have been reinforced to withstand the high nozzle pressures and temperatures existent in rockets.

A rocket normally consists of a cylindrical body containing a head and at the opposite end a nozzle fixed to the body and having a reduced aperture through which the gases developed by the propellant in the rocket escape from the rocket and give it its thrust. The solid propellants being used today frequently contain heavy particles which are inserted in the propellant in order to increase the specific thrust of the propellant. One of the serious problems with nozzles is the abrasion caused by the high temperature and the velocity of the exhaust gases containing the heavy particles. If erosion does occur in an unbalanced condition on one side of the nozzle, it frequently tends to throw the nozzle or rocket off course.

The best known material for high temperature pressure resistance is ceramic, but the problem is to reinforce such material to withstand the high temperature and high pressures.

It is therefore an object of this invention to provide a light-weight yet pressure- and temperature-resistant ceramic rocket nozzle. It is a further object of this invention to develop a ceramic rocket nozzle which will be reinforced both longitudinally and transversely. It is a further object of this invention to develop a ceramic rocket nozzle which may be easily affixed to or removed from a rocket body. This and other objects will appear as this specification proceeds.

In summary, this invention accomplishes these objectives by providing a ceramic rocket nozzle onto which there is wound under tension a thin strip of alloy metal either in overlapping relationship or with butted edges, which metal strip is then brazed or bonded either to itself, to the permanent core if there be one, or to the next layer of strip, to form a continuous outer tensioned layer over the ceramic body. This layer of thin metal stripping tends to put the ceramic nozzle in compression and thus causes it to be resistant to the high pressures to which it is subjected.

In order to provide a longitudinal resistance to stress there is further provided a looped prestressing wire which passes along the length of the ceramic body and around its perimeter. This may be applied first and then the thin metal stripping wrapped over it, placing the high tensile strength prestressing wire in high tension, which is translated into high compression longitudinally in the ceramic nozzle.

The thin strip of alloy metal, which might vary in thickness between one five-thousandth of an inch to twelve ten-thousandths of an inch, and two inches wide, with its edge milled to remove edge defects, in the preferred embodiment is wound around the unit in overlapping fashion and the overlapped portions are brazed or bonded to each other to provide great strength to resist the internal pressures. Alternatively the strip may be wound diagonally with edges butted and, if several layers are applied, they may be brazed or bonded to each other to form a monolithic casing. The metal strip is wound onto the unit under high tension, which might be applied in any one of a number of suitable ways, such as by passing the strip over a brake-drum-like arrangement which is subjected to a controlled rotational torque and thus applies a known tension to the strip. When the overlapping technique is used, the overlapping portion of the strip is coated with a bonding or brazing material, at least over the length of it, well overlapping the previous strip in the course of its length along the vessel. A suitable brazing material for alloy steel has been found to be silver, which when heated will form quite a strong bond between the layers of the thin metal, if maintained under pressure during the application of heat. The strip may be bonded to the ceramic by adhesive or brazed to a piece of metal cast in the ceramic. In one embodiment it may also be overlapped and brazed to itself. The amount of overlap which exists between the various layers of the thin metal stripping is a function of the pressure to which the nozzle will be subjected and can be easily controlled during manufacture. It has been found that the brazing, with silver particularly, has a high shear strength, but if it is necessary to increase the shear strength it may be done by adding an abrasive to the silver to increase the bonding longitudinal shear strength. This abrasive might be carborundum or any suitable abrasive, but must be of extremely fine particle size, which should not be over 50% of the thickness of the metal on either side of the joint.

Reference is now made to the drawings, in which there is shown a preferred embodiment of this invention. However, these are deemed to be illustrative only and the metes and bounds of this invention should be determined from the appended claims.

In the drawings, FIGURE 1 is a sectional elevation of the rocket on the mandrel.

FIGURE 2 is a section through 2—2 of FIGURE 1.

FIGURE 3 is a section showing the overlapping strips of metal with the interconnecting material.

Figure 5:
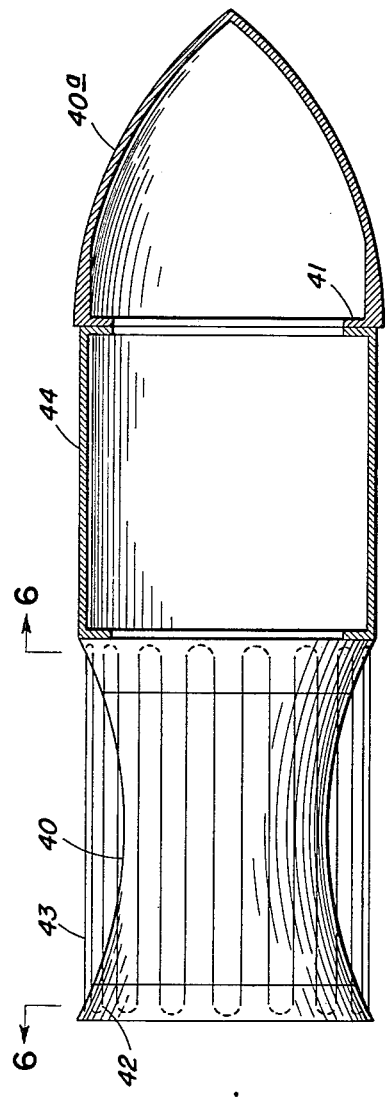
FIGURE 5 is a sectional elevation showing one embodiment of the rocket nozzle bolted to a rocket body.
Figure 6:
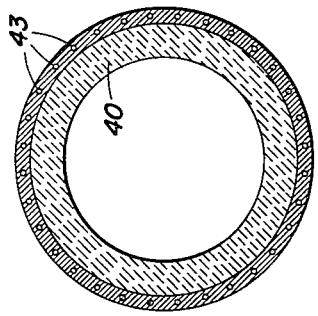
FIGURE 6 is a section through 6—6 of FIGURE 5.

More particularly in the drawings, there is provided a core or mandrel 10 of a length and diameter to be determined according to the size of the rocket body desired. At one end of the mandrel there is mounted a nosepiece 11, which has attached to it a flange 13. Flange 13 should be approximately the same diameter as the mandrel. The shoulder 14 formed between the nosepiece and the flange should be just large enough to contain the strip which is wrapped around the flange.

At the opposite end of the mandrel there is provided an inturned flange 16 which is connected to nozzle 12. The nozzle 12 preferably has a ceramic body which is provided at its forward end with a reinforcing ring member or inturned flange 16a connected to the inturned flange 16 of the mandrel, and at its forward end has a reinforcing ring member 116. This nozzle has an orifice 27, through which it may be charged or filled with propellant for the rocket body, and through which the gases escape.

The thin metal strip 15 is brazed to the forwardmost end or edge of the flange 16 and is then wrapped continuously along the flange 16 and along the mandrel 10 and finally along the flange 13 in overlapping relationship. The amount of the overlap will determine the amount of the pressure that the vessel will contain. If this does not provide sufficient pressure resistance, an additional layer or layers of similarly placed strips may be applied. After the strip is wound onto the vessel, heat may be applied to the outer portion of the strip in order to cause the silver brazing material 15a or other brazing or bonding material to bond the overlapping portions of the strip to each other. The core or mandrel 10 is then removed to provide a finished body. FIGURE 3 shows the overlap of a strip 15a in exaggerated form as applied to the ceramic nozzle body, with the ends of the strip bonded to the respective reinforcing ring members 116 and 16a. In practice the overlap would be far greater than that shown.

The purpose of wrapping under tension is to create, among other things, a radial pressure to develop better brazing. The addition of abrasive dust to the area being brazed or bonded greatly increases the bond. These particles may be up to 50% of the thickness of the strip.

Figure 4:
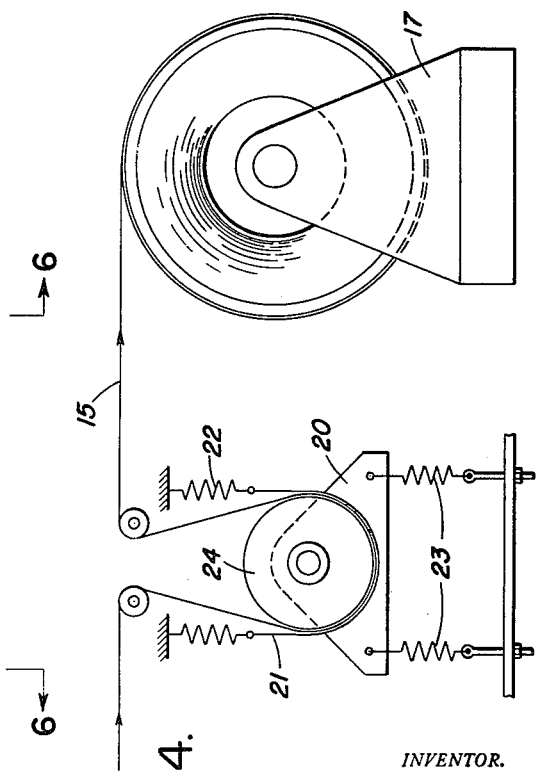
FIGURE 4 is a schematic showing of means for tensioning the metal strip.

In FIGURE 4 there is shown schematically a means of applying tension to strip 15. This strip may be passed over a plate 20 on which is mounted a drum 24, around which is a brake arrangement 21. The plate 20 is spring-mounted by means of springs 23 to move in a transverse direction. The brake arrangement 21 is similarly spring-mounted by springs 22, in order to apply a varying pressure against the drum 24. The strip 15 passes around the drum and inside the brake and is subjected to a varying but predetermined pressure and hence tensioned by the amount of spring tension applied either through springs 23 or springs 22. Starting the winding operation it then passes, for example, around the end piece flange or reinforcing ring member 116 and onto the assembly as described. The mandrel and end pieces to be formed are mounted in turn in a chuck or similar arrangement 17, which is motor-driven so that they may be rotated.

In FIGURE 5 there is shown a nosepiece 40a which has a metal flange 41, by means of which it may be bolted to rocket body 44 of any suitable size and shape. The ceramic nozzle 40 connected to this rocket body has holes 42 or hairpin grooves through which or around which a high-tensile strength prestressing wire 43 may be wound around the perimeter of the nozzle.

Figure 7A:
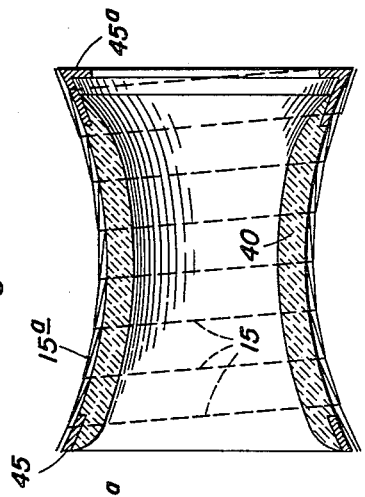
FIGURES 7a, 7b and 7c show three steps in the applying of the thin strip material and tensioning wire to the ceramic body.

FIGURE 7a shows a reinforcing ring member or inturned flange 45a affixed to the forward end of the nozzle body 40 in order to accommodate its attachment to the rocket body, and a reinforcing ring member 45 at the trailing end, to provide terminal surfaces for the wrapping of the thin strip 15a, as discussed above.

Figure 7B:
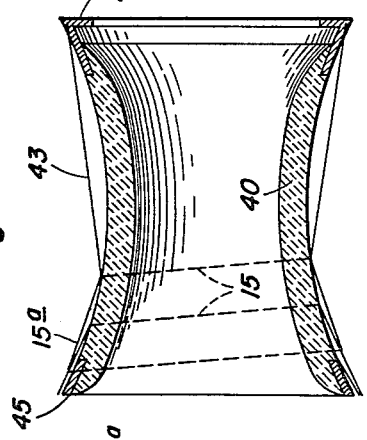
Figure 7C:
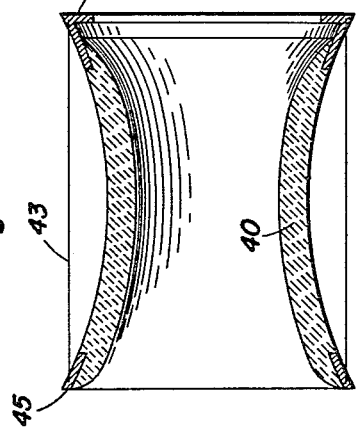

FIGURES 7a, 7b and 7c show the sequence in forming a reinforced ceramic nozzle and in FIGURE 7a the high-tensile strength prestressing wire 43 is shown in place around the perimeter of the nozzle and attached to the respective flanges. In FIGURE 7b the flat thin strip 15 is begun to be wrapped around the flange 45 of the ceramic nozzle 40 in overlapping relationship and has passed onto a small portion of the nozzle so that it has forced the prestressing wire 43 tightly against the body of the nozzle. The ceramic body is provided with grooves into which the wires fit. In doing this, of course, it places the prestressing wire 43 in high tension and this in turn places the entire nozzle assembly in high longitudinal compression.

In FIGURE 7c the flat strip 15 has been extended along the entire length of the nozzle body and has placed the tensioned wire 43 tightly against the body along its entire length. By thus providing a longitudinal compression through the tensioned wire 43 and a transverse compression through the tensioned strip 15, we have provided a nozzle of ceramic material which will resist the various stresses to which it will be subjected in the course of its use as a rocket nozzle.

Figure 8:
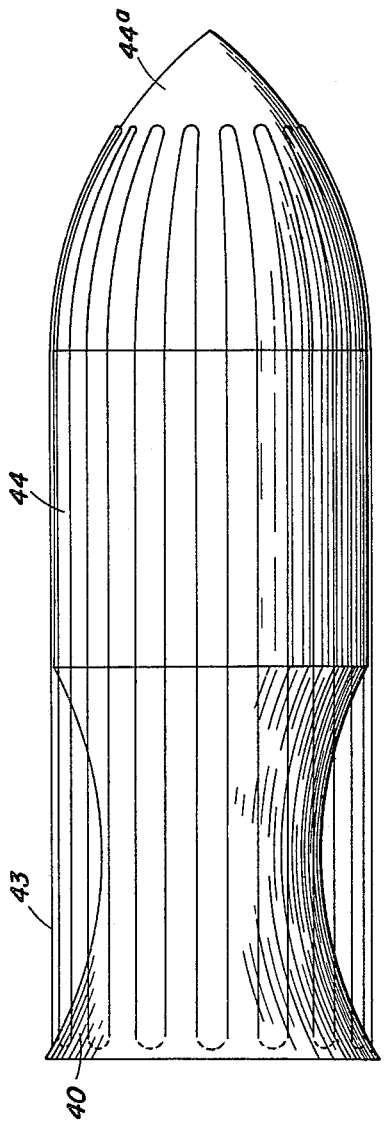
FIGURE 8 is a further embodiment with tensioning wire along the length of the nozzle and rocket body.

FIGURE 8 shows a further embodiment in which the tensioned wires 43 extend along the entire length of the nozzle 40 and the rocket body 44 and 44a. They are affixed at one end to the orifice or trailing end of the nozzle and at the other end to the body nosecone 44a. By spirally wrapping a flat strip or a wire, beginning at the orifice, the prestressing wire 43 will become tensioned along its entire length and will tend to place the nozzle and the rocket body in longitudinal compression and force them tightly together.

What has been illustrated so far shows the use of a tensioned wire applied underneath a layer of thin metal stripping. It is, of course, possible, depending on the particular circumstances of the stresses involved, to first apply a layer of metal stripping 15, then apply over it the tensioned wire 43 and finally a last layer of metal stripping 15 covering the prestressing wire. A further alternative would be to apply the tensioned wire first and then to apply a plurality of layers of thin strips over it, depending on the particular tensions to which the nozzle would be subjected.

The direction of wrapping may be such that the wrapping is applied from either direction, but for wind resistance it is more desirable to wind the strip in the direction of the nose of the rocket so that the uppermost overlapped edge will be formed away from the nose. By doing this it is also possible to exert a more uniform tension in the case where the wires extend along not only the nozzle but also the body of the rocket, and thus tie the nozzle and rocket body together.

In place of a flat overlapping or butted strip, which is the most desirable, it is also possible to use high tensile strength round or square wire, which need not be abutting, to place the nozzle in bi-axial compression greater than the tensile forces imposed on it.

Figure 9:
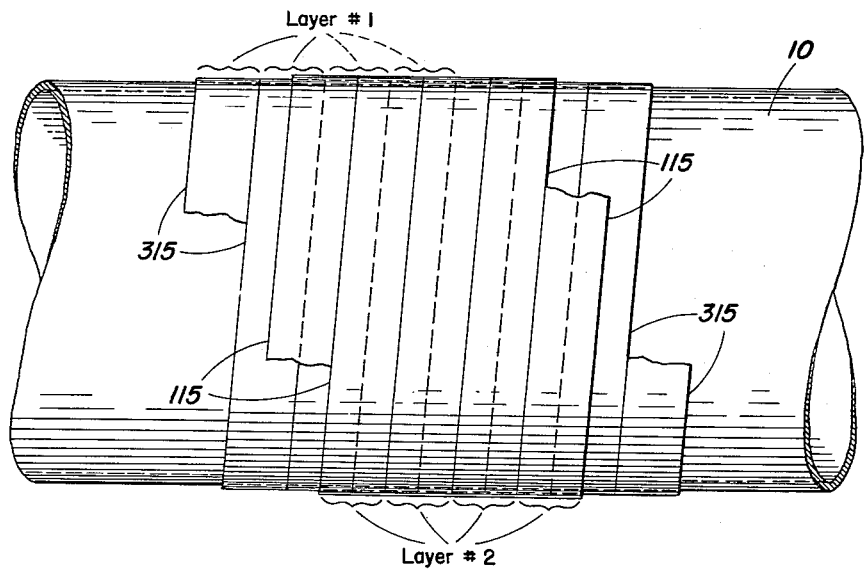
FIGURES 9 and 10 show further methods of applying the metal strip.
Figure 10:
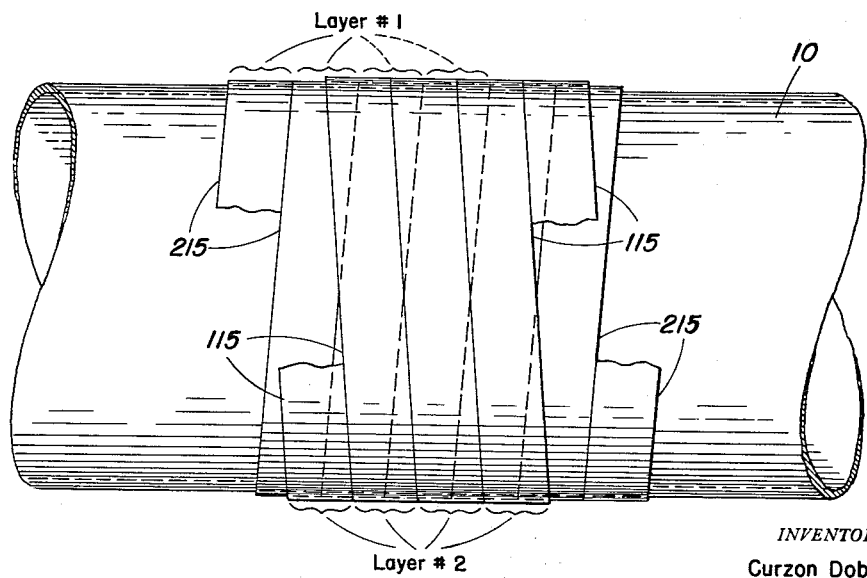

FIGURES 9 and 10 show further embodiments in which the overlapping technique is not used. In these embodiments the strips 115 are butted side by side in close contact. They are then overlain in FIGURE 10 by strips 215 which are wound diagonally in an opposite direction. In FIGURE 9 the second layer 315 is wound in the same direction, with edges butted, but with the strips slightly displaced so that the butt edges of one layer do not fall directly over the butt edges of the layer underneath. Further layers may also be used. The layers may be brazed or bonded to each other and to the core if one is used.

I claim:

1. A reinforced rocket nozzle comprising a nozzle body having a constricted intermediate waist portion and flaring end portions; high tensile strength reinforcing linear elements extending longitudinally of said nozzle body and spaced from one another peripherally about said nozzle body and secured to respective flaring ends thereof; a spirally wound element wrapped under tension around said nozzle over said reinforcing linear elements, so that said linear elements are tensioned by the tensioning of said spirally wound element when wrapped thereon and causing said linear elements to be forced into contact with the constricted surface of the nozzle, said spirally wound element thus coacting with said linear elements to place the nozzle body under combined radial and longitudinal compression; and means for securing said spirally wound element in place.

2. The rocket nozzle according to claim 1, wherein the wires are counter-sunk in said nozzle body.

3. A reinforced rocket nozzle comprising a ceramic nozzle body having a constricted waist portion end flaring end portions with a reinforcing ring member provided on each end; high tensile strength reinforcing linear elements extending longitudinally of said nozzle body and spaced from one another peripherally about said nozzle body and secured relative to respective reinforcing ring member; a spirally wound element wrapped under tension around said ceramic nozzle body and over said linear elements, so that said linear elements are tensioned by the tensioning of said spirally wound element when wrapped thereon, said spirally wound element thus coacting with said linear elements to place the nozzle body under combined radial and longitudinal compression; and means for securing said spirally wound element in place.

4. The rocket nozzle according to claim 3, wherein the ends of said spirally wound elements are bonded to respective ring elements.

5. The rocket nozzle according to claim 3, wherein said linear elements are counter-sunk in said nozzle body.

6. The rocket nozzle according to claim 3, wherein said linear elements are counter-sunk in said nozzle body, and the ends of said spirally wound element are bonded to respective reinforcing rings.

7. The rocket nozzle according to claim 3, wherein said longitudinal wires are counter-sunk in said nozzle body, and wherein the ends of said spirally wound element are bonded to respective ring members, with the spirally wound element itself bonded to said wires.

8. The rocket nozzle body according to claim 3, wherein said spirally wound element is a high tensile strength wire.

9. The rocket nozzle according to claim 3, wherein said spirally wound element is a flat metallic strip.

10. The rocket nozzle according to claim 3, wherein said spirally wound element is a metallic strip applied with the windings in mutually edgewise abutting relationship.

11. The rocket nozzle according to claim 3, wherein said spirally wound element is a metallic strip applied with the windings in overlapping relationship.

12. The rocket nozzle according to claim 3, wherein said spirally wound element is a metallic strip applied with the windings in overlapping relationship and the overlapping portions bonded to each other.

13. The rocket nozzle according to claim 3, wherein one end of said nozzle is provided with means for attachment to a rocket body.

14. The rocket nozzle according to claim 13, wherein said means for attachment to the rocket body comprise an inturned flange.

15. The arrangement according to claim 13, with the addition of a rocket body attached to one end of said nozzle, and wherein said spirally wound element extends in a continuous length from said nozzle body to said rocket body.

16. A rocket propulsion arrangement comprising, a rocket nozzle body having a constricted intermediate waist portion and flaring end portions; a rocket body extending from one end of said nozzle body; high tensile strength reinforcing linear elements extending longitudinally of said nozzle body and said rocket body and spaced from one another peripherally about said bodies, said linear elements having one end secured to the free end of the nozzle body and the other end secured to the rocket body; a spirally wound element wrapped under tension at least around said nozzle body and over said linear elements, said linear elements being tensioned by the tensioning of said spirally wound element when wrapped thereon, said spirally wound element thus coacting with said linear elements to place the nozzle body under combined radial and longitudinal compression; and means for securing said spirally wound element in place.

17. The rocket propulsion arrangement according to claim 16, wherein said nozzle body is provided with a reinforcing ring member at each end, and wherein one end of said spirally wound element is bonded to the ring member at the free end of the nozzle body, while the other end of said element is bonded to said rocket body.

18. The rocket propulsion arrangement according to claim 16, wherein there is provided an inturned flange connection between said nozzle body and said rocket body.

19. The rocket propulsion arrangement according to claim 16, wherein said rocket body has a forward terminal nose section, and wherein said linear elements are secured to said nose section.

20. The arrangement according to claim 19, wherein said linear elements are attached to said nose section close to the forward pointed end thereof.

References Cited in the file of this patent
UNITED STATES PATENTS

| | | |
|---|---|---|
| 1,763,360 | Kean | June 10, 1930 |
| 2,109,529 | Goddard | Mar. 1, 1938 |
| 2,743,514 | Duecy | May 1, 1956 |
| 2,933,888 | Africano et al. | Apr. 26, 1960 |
| 2,937,595 | Margulis et al. | May 24, 1960 |